June 25, 1935.   W. L. McNAMARA   2,006,056
RING HOLDER LOCK
Filed Nov. 16, 1929

INVENTOR
William L. McNamara
BY
Norman N. Holland
his ATTORNEY

Patented June 25, 1935

2,006,056

UNITED STATES PATENT OFFICE 2,006,056

RING HOLDER LOCK

William L. McNamara, Connellsville, Pa., assignor to Capstan Glass Company, Connellsville, Pa., a corporation of Delaware Application November 16, 1929, Serial No. 407,630

8 Claims. (Cl. 49—41)

The present invention relates to molds and associated parts for glass machines and the like, and more particularly to means for correcting the position of the parts and for preventing wear thereof.

In modern glass machines for fabricating glass articles from molten glass, particularly food containers, it is customary to form the lower part of the container with one mold and the upper part or neck of the container with another mold. The mold for the neck is usually termed a split ring and the mold for the bottom part of a blown article either a blank or blow mold, depending upon whether it is the blanking operation or the blowing operation. The glass, of course, has to be transferred from the blank or parison mold to the blow mold for the successive operations thereon. In doing this, the blank mold is usually inverted and opened to permit the blank to be removed to the blow mold. Each of the molds has to be opened every time a blank is removed therefrom. Since the articles are fabricated at the rate of about thirty a minute, there being usually six molds to a table, the molds open and close five or six times a minute. Naturally, this occasions considerable wear on the parts.

Present machines have holders for both the split ring and for the blank and blow molds. These members, due to wear and tear occasioned by repeated opening and closing, soon become loose and fail to hold the glass molds properly. The result is imperfect glass and defective ware, necessitating frequent changes of both the molds and the holders. Since metallic caps are generally sealed to glass containers, their size is required to be within specified limits of variations. Furthermore, slight fins or the like render the containers defective; therefore, it is essential that the molds be at all times in as nearly perfect condition as possible. In forming screw threads on containers such as glass jars, any play in a vertical plane will mar the threads to such an extent that a metallic cap will not fit. This has occasioned considerable difficulty in the past.

The present invention aims to overcome the above difficulties by maintaining the parts in accurate position, thereby minimizing the wear on the molds and mold holders and avoiding defective ware. This is accomplished by inexpensive changes in the molds and holders which may be readily applied to existing machines with slight expense.

An object of the present invention is to eliminate or minimize wear in split rings, blank and blow molds on glass machines.

Another object of the invention is to provide an inexpensive improved interlocking device on split ring holders, mold holders and the molds proper.

Another object of the invention is to provide an improved interlocking device which keeps the split rings and associated mechanism in the same horizontal plane while closed, thus relieving the strain at the pivots and positively assuring the correct position of the mold parts at the time the glass is shaped.

A further object of the invention is to provide a mechanism which decreases the wear on the rings, thus decreasing maintenance costs and prolonging the life of the parts.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein, Fig. 1 is a top plan view of a mechanism illustrating the present invention applied to the holders for a split ring and for a blank mold;

Figure 1:
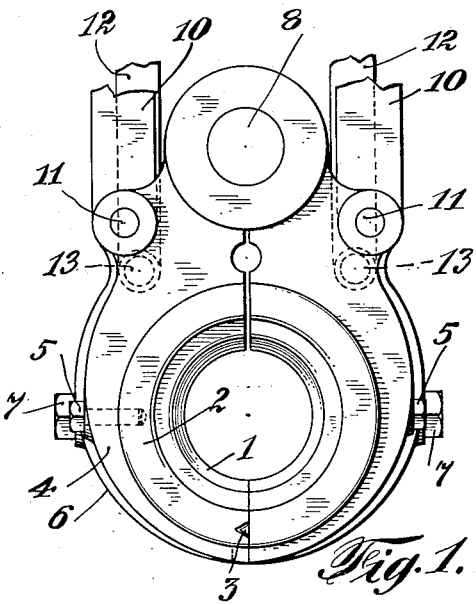
Figure 2:
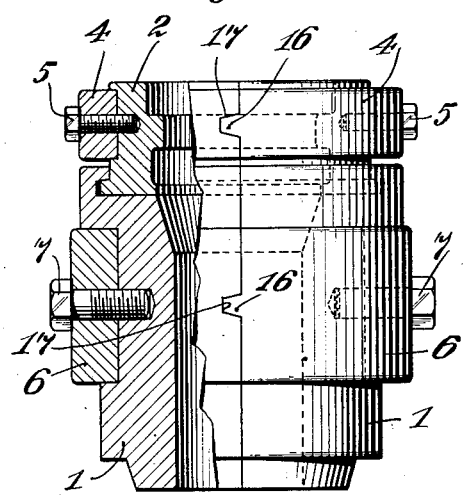
Fig. 2 is a side elevational view, partly in section, of the mechanism shown in Fig. 1.

The mold shown in the accompanying drawing may be the type used in a "Lynch" bottle machine. A gob of glass is first dropped into a blank mold, where the neck is formed, and thereafter transferred to a blow mold where compressed air applied to the blank shapes it into a bottle or other article. The invention is illustrated in Figs. 1 and 2, applied to the holders for a split ring and a blank mold. The blank mold 1 is associated with a split ring 2 immediately above the blank mold having a longitudinally extending tongue and groove 3. The split ring shapes the neck of the bottle or other container. The blank mold envelops the lower part of the blank.

The split ring 2 fits snugly into a pair of arcuate holding members 4, commonly known as a split ring holder, and may be connected thereto by tap bolts 5. Likewise, the blank mold 1 is embraced by a pair of holding members 6, commonly termed blank mold holders, which are held firmly thereto by tap bolts 7. The split ring holder 4 and the blank mold holder 6 are pivoted to the stationary vertical pin 8, shown in Fig. 1. This pivoted arrangement permits the split ring and blank mold holders to be opened and closed. The operation of the split ring holder is effected by a link mechanism, partially shown in the drawing, which terminates in the links 10 pivotally connected to the split ring holder by the upwardly extending pins 11. The blank mold holder is actuated similarly by a mechanism which is connected by the links 12 to the pivot pins 13 of the blank mold holder. The link mechanism is so constructed that the blank mold and ring mold are opened and closed at definite, predetermined intervals.

The free ends 15 of the split ring holder are, upon closing, interlocked by a tongue 16 and groove 17, which guide the corresponding members of the ring holder and mold holder into the same horizontal plane and thus insure the proper alignment of the mold parts during the bottle forming operation. The tongue and groove also serve to overcome the sagging of the pivoted members and thereby decrease the strain on the pivot 8. The wear and tear of the mold parts and the link mechanism is thus greatly diminished. A similar tongue 16 and groove 17 are formed in the ends of the blank mold holder 6 for the same purpose.

Figure 5:
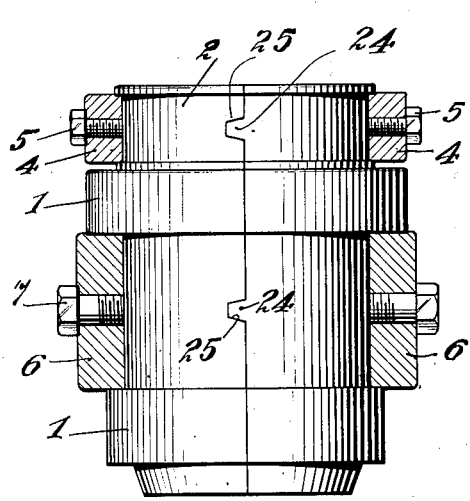
Fig. 5 is a side elevational view with parts broken away to illustrate the details of the lock applied to the mold parts.

A further application of the invention is shown in Fig. 5 of the drawing. The ring members 4 and the mold holders 6 are provided with tongue and groove members 16 and 17, described hereinbefore. In addition, the mold members themselves, and the split ring members, are shown provided with the tongue and groove members 24 and 25 which may, for convenience, be similar to those shown either in Fig. 3 or Fig. 4. The purpose of these members is to lock the mold members tightly in position and to avoid play between the parts. As illustrated, the members 24 and 25 are shown only on the outermost parts of the ring members and mold members adjacent their outer periphery. This is found to be a convenient place for placing the tongue and groove members, although it will be understood that they may be placed at any other convenient point. It will be understood also that additional tongue and groove members may be provided on the inner sides of the mold and ring members. Their action, in each case, will be similar to that described with respect to the ring holder and the mold holder members. In Fig. 5, the ring holder and mold holder have been broken away in order to give a front elevational view of the tongue and groove members on the ring holder and mold parts. In certain instances, many of the advantages of the invention may be secured by the tongue and groove members being applied to the mold and ring members alone.

Figure 3:
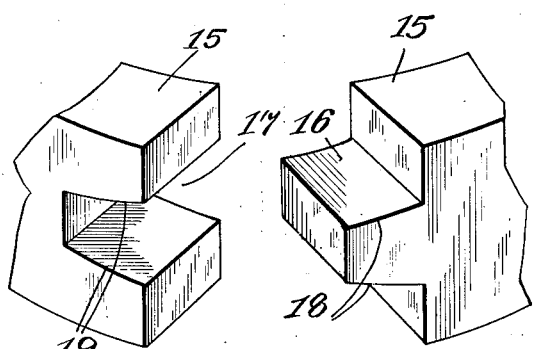
Fig. 3 is an enlarged view of the lock illustrating the details thereof.

Fig. 3 is an enlarged perspective view of one form of locking means wherein the free ends 15 of the split ring holder are about to engage. The tongue 16 and the groove 17 conform to the curvature of the arcuate members 15 and are preferably at the middle thereof. The tongue tapers on its upper and lower faces 18 in order to facilitate co-operation with the groove 17 and to gradually move the parts to their correct position. The groove 17 is located directly opposite the tongue and extends inwardly to conform with the shape of the tongue 16, thus allowing the tongue and groove to interlock and engage snugly. The tapered portions 18 of the tongue and the flaring portions 19 of the groove permit a sliding engagement of the parts when the split ring holder and blank mold holder are closed. When the faces 18 and 19 of the tongue and the groove are in contact, the holder is locked and vertical movement is impossible. The groove gives a wide opening for the tapered tongue and, hence, if one side of the holder is substantially above or below the other side, the tapered faces 18 engage the flared faces 19 to raise or lower the parts into proper position during the final closing operation and then hold them in accurate position.

Figure 4:
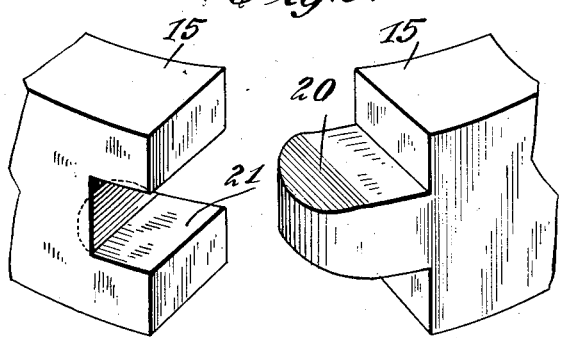
Fig. 4 is an enlarged view of a slightly different form of lock, illustrating the details thereof.

Fig. 4 illustrates another form of a locking mechanism. The tongue and groove terminate in a substantially semi-circular wedge-shaped abutment. The faces 20 of the tongue are tapered at their ends and are guided by the flared surfaces 21 of the groove to engage and lock the parts in position when the split ring holder or blank mold holder is closed. This type of tongue and groove arrangement is also very efficient in relieving the axial strain on the pivot 8 and correctly positions the parts. In fact, the construction in Fig. 4 is even more accurate than that of Fig. 3 because, where the ends do not completely close in Fig. 3, there may be slight play. In Fig. 4, the tapered faces 20 position the parts and the straight portions of the faces hold the parts in position irrespective of whether or not the ends of the holder meet.

In operating the device, the link mechanisms 10 and 12 are actuated by cams or other suitable means, directly or indirectly, at a predetermined time to close the jaws of the split ring, blank mold and the holders. The locking means approach each other, as shown in Figs. 3 and 4. The tapered edges of the tongue wedge their way inwardly into the corresponding groove and engage, as shown in Fig. 2. When the mold is in this position, the pivoted parts thereof cannot move in a relatively vertical direction as the lock causes them to be clasped tightly. The molten glass, fed to the mold in the usual manner, is made to assume its intended shape. Upon completion of the blanking operation, the hinge mechanism for the blank mold is actuated to allow the blank to be transferred for the blowing operation. Irrespective of the amount of wear on the hinge pins and link mechanisms, the parts will always be locked in accurate position. Furthermore, wear is minimized by relieving the strains on the parts.

It will be seen that the lock for the split ring, blank mold, or blank mold holder and split ring holder insures a perfectly rigid, non-shifting engagement of the jaws, while the glass article is molded. The improved lock contruction serves to guide the jaws together and prevents relative vertical movements between the parts of the mold proper. The strain at the pivot is thus greatly diminished and the life of the parts is prolonged. Replacing or repairing molds, split rings or holders is an expensive operation as it requires time and slows up production. An added expense of replaced parts cuts deeply into the profits of the manufacturer. The present invention has eliminated or minimized these difficulties. The benefits derived therefrom are a substantial factor in increasing plant economy.

As various changes may be made in the form, construction, and arrangement of parts without departing from the spirit and scope of the invention and without sacrificing its advantages, it is to be understood that all matter herein is to be interpreted as illustrative and not in a limiting sense.

Having thus described my invention, I claim:

1. In a device of the class described, the combination of a pair of members pivoted together about a vertical axis to swing in a substantially horizontal plane and adapted to extend about and support a split ring associated with a glass mold, the free end of one of said members having a groove at the outer periphery thereof, the other of said members having a horizontally extending tongue thereon and in a direction transversely of the axis of the pivot whereby said tongue and groove co-operate with each other to lock said split ring accurately in position when it is closed to prevent relative vertical movement therebetween.

2. In a device of the class described, the combination of a pair of mold members, a pair of ring mold members, one of said mold members having a slot in the outer surface thereof extending transversely of the axis thereof, the other of said mold members having a tongue adapted to engage and lock with said slot, one of said ring mold members having a slot in the outer periphery thereof, the other of said ring mold members having a tongue adapted to enter into said slot and lock therewith, a pair of mold supporting members pivoted on a substantially vertical axis for mounting said ring mold members to swing in a substantially horizontal plane, one of said mold supporting members having a slot in the outer surface thereof, the other of said mold supporting members having a tongue adapted to fit into and lock with said slot, and a pair of ring mold supporting members for supporting said ring molds to swing in a substantially horizontal plane, one of said mold supporting members having a slot in the outer surface thereof, the other of said ring mold supporting members having a tongue adapted to fit into and lock with said slot, said tongues and slots in said ring mold and mold supporting members being visible from the exterior thereof and extending transversely of the axis of the pivot therefor to lock the supporting members against relative movement in a vertical direction.

3. In a device of the class described, the combination of a pair of mold members, a pair of ring mold members, one of said mold members having a slot in the outer surface thereof extending transversely of the axis thereof, the other of said mold members having a tongue adapted to engage and lock with said slot, one of said ring mold members having a slot in the outer periphery thereof, the other of said ring mold members having a tongue adapted to enter into said slot and lock therewith, a pair of mold supporting members for swingably mounting said mold members, one of said mold supporting members having a slot in the outer surface thereof, the other of said mold supporting members having a tongue adapted to fit into and lock with said slot, and a pair of ring mold supporting members for swingably supporting said ring molds, one of said mold supporting members having a slot in the outer surface thereof, the other of said ring mold supporting members having a tongue adapted to fit into and lock with said slot, said slots in said ring mold and mold supporting members being aligned with each other and being visible from the exterior thereof and extending transversely of the axis thereof to receive the similarly aligned tongues to lock the supporting members against relative movement in a vertical direction, the tongues in said molds and said ring molds and in said mold supporting members and ring mold supporting members having a tapered surface adjacent the ends thereof to facilitate closing of the molds and having a substantially flat horizontal surface merging into said tapered surfaces to accurately position the parts when they are substantially closed.

4. In a device of the class described, the combination of a pair of pivoted ring mold members adapted to swing in a substantially horizontal plane, one of said mold members having a longitudinal groove in the free end thereof, and a transversely extending slot on the exterior surface thereof at the end thereof furthest removed from the pivot, the other of said mold members having a longitudinal tongue at the end thereof furthest removed from the pivot adapted to fit into said longitudinal groove and having a transversely extending tongue at the free end thereof adapted to fit into said transversely extending slot to lock the mold parts against vertical movement, said transversely extending tongue and groove being visible from the exterior of the mold when the mold is closed to facilitate removal of any extraneous matter accumulating therein.

5. In a device of the class described, the combination of a pair of members adapted to extend about and support a pair of split ring members associated with a glass mold, said supporting members being pivoted at one end about a vertical axes to swing in a substantially horizontal plane and the other ends thereof being adapted to abut each other when the ring members are closed, the end furthest removed from said pivot of one of said supporting members having a groove extending transversely and horizontally thereof, the ring member supported by said supporting member having a groove forming substantially a continuation of the groove in said supporting member, the other of said supporting members having a horizontally extending tongue thereon adapted to fit into said groove, the ring member attached to said supporting member having a tongue forming substantially a continuation of the tongue on said supporting member and adapted to engage the groove in said other ring member, said tongue and said groove on said supporting members being visible when the members are in closed position to facilitate removal of glass or other extraneous matter from the groove in said supporting member and in said ring member, said tongues and grooves being adapted to cooperate with each other to lock said split ring in position when it is closed, to prevent relative movement therebetween in a direction parallel to the pivotal axis.

6. In a device of the class described, the combination of a pair of split ring mold members swingably mounted on a vertical axis to swing in a substantially horizontal plane, one of said members having a groove in its outer surface having substantially parallel flat portions, the other of said members having a horizontal tongue extending transversely to the axis of the mold members adapted to fit into said groove, said tongue and groove being on the ends of said ring mold members furthest removed from the pivot, said tongue having substantially parallel flat portions adapted to engage the flat portions of said groove and definitely position the two parts of the mold in a vertical direction with respect to each other and having also a tapered end adapted to facilitate entrance into the groove and to raise the parts into proper alignment.

7. In a device of the class described, the combination of a pair of ring mold members, a pair of blank mold members, one of said ring mold members and one of said blank mold members having a groove on the exterior surface at the free end thereof, extending transversely of the axis of the mold, the other of said ring mold members and the other of said blank mold members having a tongue at the free end thereof extending transversely of the axis of the mold to fit into and lock with said groove, a pair of mold supporting members for swingingly supporting the ring mold members, a pair of mold supporting members for swingingly supporting said blank mold members, one of said ring mold supporting members and one of said blank mold supporting members having a horizontal groove in the free end thereof extending entirely across the end thereof and in alignment with the groove in the mold member supported thereby, whereby the groove in the mold member is a continuation of the groove in the supporting member in each case, the other of said ring mold supporting members and the other of said blank mold supporting members having a tongue at the free end thereof in alignment with the tongue on the mold member in each case, whereby the tongue on said mold supporting member is a continuation of the tongue on said mold member in each case, said tongues and said grooves on said mold supporting members being visible from the exterior thereof when closed to facilitate removal of any extraneous matter from said grooves and being adapted to cooperate with the tongue and groove in said mold members to lock the parts against vertical movement when the molds are in closed position.

8. In a device of the class described, the combination of a pair of pivoted members adapted to retain split ring molds for making glass articles, said pivoted members being swingably mounted on a vertical axis to swing in a substantially horizontal plane, one of said members having a recess at its free end, the other of said members having a horizontal tongue at its free end extending transversely of the axis of the pivot to fit into said recess, said tongue and recess being at the ends of said pivoted members furthest removed from the pivot, the end of said tongue being substantially smaller than the entry end of said recess to facilitate entrance into the recess and to raise the parts into proper alignment and also to definitely position the ends of the two mold retaining members in a vertical direction with respect to each other.

WILLIAM L. McNAMARA.